Aug. 6, 1957 J. F. DALTON 2,802,062

TELEPHONE HANDSET SHOULDER SUPPORT

Filed Aug. 23, 1955

INVENTOR
J. F. DALTON
BY John C. Moris
ATTORNEY 2,802,062
Patented Aug. 6, 1957

2,802,062

TELEPHONE HANDSET SHOULDER SUPPORT

John F. Dalton, Springfield, N. J., assignor to Bell Telephone Laboratories, Incorporated, New York, N. Y., a corporation of New York Application August 23, 1955, Serial No. 530,180
5 Claims. (Cl. 179—157)

This invention relates to shoulder supports for telephone handsets and more particularly to such supports that enable the user to employ both hands for writing, typing, or like tasks while engaging in telephone conversation.

In the past there have been proposed a variety of supports for supporting a telephone handset of the one piece type from the head, neck, and body. All such devices have the object of enabling the user to retain the handset in an operative position without the use of the hands, and such that, at the one end the receiver is properly coupled to the ear while, at the other end, the transmitter is in position with respect to the mouth. One of the difficulties presented in designing a support for a telephone handset is that of insuring this desired coupling between mouth and transmitter and ear and receiver among a wide group of telephone subcribers having an infinite variety of head and body and head-to-body dimensions. Heretofore, shoulder supports have been rigid or semi-rigid, offering little or no adjustment and requiring a high degree of adaptation on the part of users whose body conformations differed from the standard for which the support was made; or, if the support permitted of adjustment for individual subscribers, such adjustment was inconvenient and constituted an undesirable annoyance, particularly where one telephone instrument is used by several different persons as, for example, in many commercial establishments.

It is an object of this invention to provide an improved telephone handset shoulder support for enabling use of the handset in the optimum position without the use of the hands.

More specifically, an object of this invention is to provide a telephone support capable of ready adjustment to the head and body dimensions of a wide range of telephone users.

In a specific embodiment of the telephone support of this invention, a straplike member of resilient material is formed in substantially a U-shape. One leg of the U is secured to the back surface or portion of the handset away from the orifices of the receiver and transmitter and the other leg, which may be suitably cushioned or padded, is curved to conform with the forward slope of the user's shoulder. Thus, in this arrangement each user may place the handset in the optimum operative position by availing himself or herself of the resilience of the support to insure good coupling of the acoustic elements to the ear and mouth.

It is a feature of this invention that the shoulder support comprise a U-shaped strap of a resilient material, one leg of the strap being secured to the handset and the other leg being adapted to rest on the user's shoulder.

It is a further feature of this invention that the one leg of the U-shaped strap attached to the handset be twisted or skewed with respect to the other leg.

It is another feature of one specific embodiment of this invention that the two legs of the U-shaped strap be joined in such a manner that the leg attached to the handset may be twisted to either side with respect to the other leg, thereby allowing the support to be employed by the user on either shoulder.

It is a still further feature of this invention that the resiliency of the U-shaped strap itself provide the adjustment for use of the shoulder support by different users. Accordingly, the shoulder support may be of very light weight and yet be automatically adjustable, which latter contributes to the comfort and convenience of its use. Further, because of the compact form of the support, the handset may conveniently be placed and retained in the "on-hook" or "cradled" position on the base of the telephone subset.

The invention and the above-noted and other objects and features thereof will be better understood from the following detailed description taken in connection with the drawing, in which.

Figure 1:
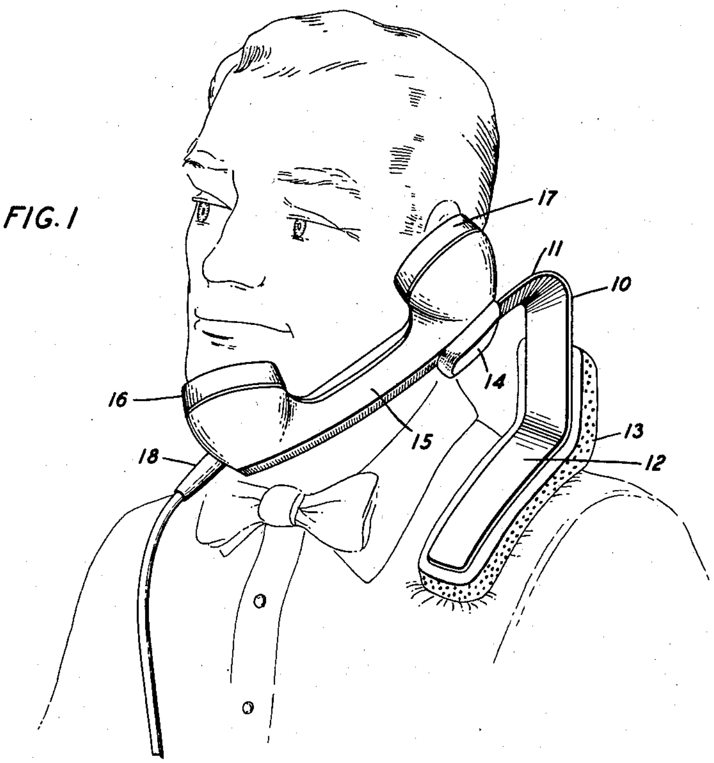
Fig. 1 is a representation in perspective of a shoulder support in accordance with one specific embodiment of this invention in use with a telephone handset, showing the manner of positioning with respect to the head and shoulder of the user.

Referring to Fig. 1, the shoulder support comprises a length of straplike material 10 which may be of a material having suitable strength and resilience such as spring steel or a thermoplastic, for example, methyl methacrylate, polystyrene, or modified polystyrene. As indicated, this length 10 of material is of substantially U-shape having a shorter leg 11 and a longer leg 12 which are twisted or, in other words, skewed, with relation to one another in order to place the cooperating elements in the proper planes. Typically, the angle of skew between the two legs may be about thirty degrees. The leg portion 12 may have affixed to it a suitable pad or cushion 13, for example of foam rubber, for the purposes of adding to the comfort of the user and to prevent slipping of the support on the user's shoulder. The shorter leg 11 is secured to the handset by retaining screws within the housing 14 as will be explained in connection with Fig. 2.

As will be noted, the handset 15, having the connecting cord 18 protruding therefrom, is supported in position with the receiver 17 snugly positioned to the user's ear and with the transmitter 16 in proper relation to the mouth for optimum transmission. It will be seen that this support enables the proper positioning of the handset without the necessity of manual assistance for a wide group of telephone users whose ear-to-shoulder dimensions may differ considerably. Each subscriber achieves the proper coupling of the instrument to his own head by the application of a slight pressure against the inherent resilience of this U-shaped spring support.

Figure 2:
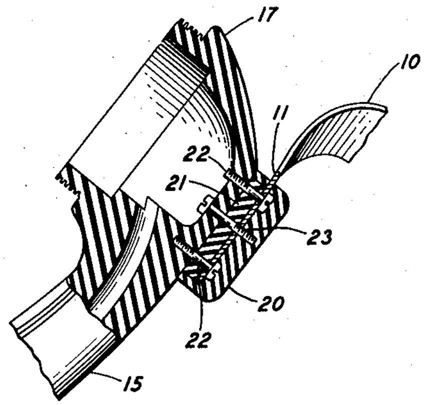
Fig. 2 is a side view, partially in section, showing the manner in which the support of the embodiment of Fig. 1 may be secured to the telephone handset.

Fig. 2 depicts a specific method for securing the straplike member 10 to the handset 15 in the region of the receiver 17. As shown, the short leg 11 is secured with an intervening spacer member 21 to the handset body by means of the retaining screws 22 which may conveniently be screwed into metal inserts molded into the handset 15. For appearance and convenience the housing or cap 20, secured by the retaining screw 23, covers the exposed screw heads 22. It will be evident that with this arrangement the shoulder support will be adapted for use on only one shoulder and will not be interchangeable from right to left, it being necessary to provide a support specifically designed for one or the other shoulder as desired.

Figure 3:
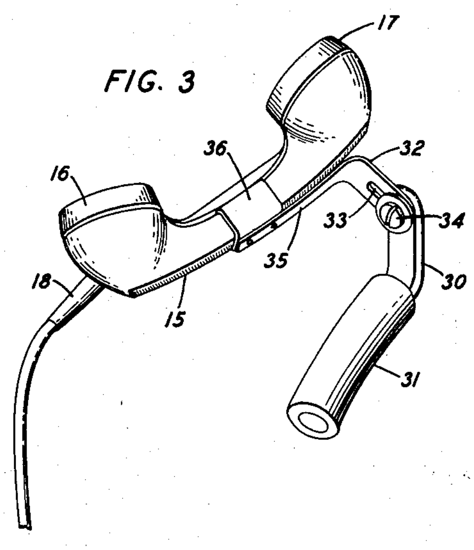
Fig. 3 is a perspective view of a further embodiment of this invention.

In Fig. 3 there is shown a further refinement of this invention illustrating the features of a mounting which is interchangeable from one shoulder to the other and in which the support may be more readily removed from the handset. In this embodiment the straplike member is in two separate L-shaped portions 30 and 32 joined by the bolt and washer arrangement 34.

As noted previously the longer leg 31 may be cushioned in some convenient manner. The shorter leg 35 terminates in a wrap around type clamp 36 which is arranged to resiliently clasp the telephone handset shank near its midpoint. A slotted hole 33 enables an additional adjustment of the ear-to-shoulder distance of the user, and adjustment to enable use on the opposite shoulder is readily made by loosening the bolt 34 and swiveling the portion 30 to the desired position and then tightening the bolt 34. For convenience the slotted head of the bolt may be of a width to admit the use of a small coin in lieu of a screw driver.

The embodiment of Fig. 3 likewise partakes of the primary head-to-shoulder adjustment feature of this invention which is provided by the resilience of a substantially U-shaped member. It may be noted that the desired degree of resilience and consequent adjustment may be achieved by having the closed end of the U-shaped member disposed to the front of the user. However, for the handling ease in placing the handset to the head and removing it therefrom the embodiment of Figs. 1 and 3 appears to be more advantageous.

It is to be understood that the above-described arrangements are illustrative of the application of the principles of the invention. Numerous other arrangements may be devised by those skilled in the art without departing from the spirit and scope of the invention.

What is claimed is:

1. A device for supporting on the shoulder of the user a telephone handset of the combined transmitter-receiver type having a shank portion therebetween, said device comprising a substantially U-shaped strap member of spring metal having a first leg portion and a second leg portion, said first leg portion including a clip member for resiliently affixing said support member to the shank portion of said handset, said second leg portion having a cushion on its outer surface adapted to rest upon the frontward portion of the user's shoulder when the handset is in the operative position.

2. A device for supporting on the shoulder of the user a telephone handset of the combined transmitter-receiver type having a shank portion therebetween, said device comprising a substantially U-shaped strap member of spring metal having a first leg portion and a second leg portion, said first leg portion including means for resiliently affixing said support member to the shank portion of said handset, said second leg portion having a cushion on its outer surface adapted to rest upon the frontward portion of the user's shoulder when the handset is in the operative position, and said first leg portion being twisted with respect to said second leg portion.

3. A device for supporting a telephone handset on the shoulder of the user comprising a substantially U-shaped strap member of resilient material having one leg including a clip member affixed to said handset and the other leg disposed so as to have the outer surface of said other leg in engagement with the frontward portion of the user's shoulder and having the closed end of said U-shaped member disposed toward the rear of the user, said closed end including articulation means for enabling one leg to be twisted with respect to the other leg.

4. A device for supporting on the shoulder of the user a telephone handset of the combined transmitter-receiver type having a shank portion therebetween, said device comprising a substantially U-shaped strap member of spring metal having a first leg portion and a second leg portion, said first leg portion including a clip member for resiliently affixing said support member to the shank portion of said handset, said second leg portion having a cushion on its outer surface adapted to rest upon the frontward portion of the user's shoulder when the handset is in the operative position, and articulation means at the base of said U-shaped member enabling the twisting of the second leg portion with respect to the first leg portion, said means comprising a flexible joint including means for locking said joint.

5. A device for supporting a telephone handset on the shoulder of the user comprising a first and a second substantially L-shaped strap member of resilient material, said first member having means for affixing one leg to said handset and having the other leg adjustably secured to one leg of said second L-shaped member, said second L-shaped member having its other leg adapted to engage the frontward portion of the user's shoulder, and means for joining said first L-shaped member to said second L-shaped member.

References Cited in the file of this patent

UNITED STATES PATENTS

| | | |
|---|---|---|
| 2,447,721 | Wahl | Aug. 24, 1948 |
| 2,525,699 | Maldonado | Oct. 10, 1950 |
| 2,625,612 | Rheins et al. | Jan. 3, 1953 |
| 2,640,111 | Smasky et al. | May 26, 1953 |